US006978875B2

(12) United States Patent
Diaz

(10) Patent No.: US 6,978,875 B2
(45) Date of Patent: Dec. 27, 2005

(54) CONVEYOR FOR CARRYING DEVICES SUCH AS PEDESTRIAN CONVEYORS

(75) Inventor: Bernard Diaz, La Seyne sur Mer (FR)

(73) Assignee: Constructions Industrielles de la Mediterranee - CNIM, Paris (FR)

( * ) Notice: Subject to any disclaimer, the term of this patent is extended or adjusted under 35 U.S.C. 154(b) by 0 days.

(21) Appl. No.: 10/775,878

(22) Filed: Feb. 10, 2004

(65) Prior Publication Data

US 2005/0016816 A1 Jan. 27, 2005

(30) Foreign Application Priority Data

Feb. 19, 2003 (FR) .................................. 03 01994

(51) Int. Cl.[7] .............................................. B65G 15/00
(52) U.S. Cl. ...................................................... 198/325
(58) Field of Search ................................ 198/324, 325

(56) References Cited

U.S. PATENT DOCUMENTS 872,457 A * 12/1907 Russel ........................ 198/324
5,215,182 A * 6/1993 Garbagnati ................. 198/635
5,234,095 A 8/1993 Patin
5,908,104 A * 6/1999 Brun-Jarret ................. 198/324
5,971,129 A * 10/1999 Stawniak et al. ........... 198/325
6,454,078 B1 * 9/2002 Behle et al. ................ 198/325
6,484,869 B1 11/2002 Brouwer et al.

FOREIGN PATENT DOCUMENTS

EP 0854108 7/1998

* cited by examiner

*Primary Examiner*—Joe Dillon, Jr.
(74) *Attorney, Agent, or Firm*—Harness Dickey & Pierce, PLC

(57) ABSTRACT

The invention relates to a conveyor between two drive systems (1 and 2) designed to convey, for example to pedestrians, a movement in a longitudinal direction (L), this device comprising a chassis (3) and means of rolling defining a rolling surface (R). The device according to the invention comprises several side walls each of which is integral to the chassis (3) and extends on a plane perpendicular to the transversal direction (T) as far as an upper edge set back from the rolling surface (R), and several axes (61) each of which extends parallelly to the transversal direction (T) and crosses several adjacent side walls, the means of rolling comprise rollers (4) rotationally assembled to the axes (61) and creating several successive rows, adjacent to the longitudinal direction (L).

9 Claims, 4 Drawing Sheets

CONVEYOR FOR CARRYING DEVICES SUCH AS PEDESTRIAN CONVEYORS

The invention relates generally to motorised conveyors, equipped with a fixed infrastructure.

More precisely, the invention relates to a passive conveyor between two active drive systems of a carrying device, such as a pedestrian conveyor, designed to convey, for example to pedestrians, a movement in a longitudinal direction, this conveyor being placed between the two drive systems in the longitudinal direction and comprising a chassis extending in a transversal direction perpendicular to the longitudinal direction, as well as means of rolling, supported by the chassis and defining a rolling surface connecting the two drive systems.

This type of device is for example disclosed in the European patent EP 0 803 464.

As this patent sets out, the purpose of such a conveyor is to allow for the transient movement of a given load, for example a pedestrian, between two drive systems operating at two different respective speeds, so that the positive or negative acceleration undergone by the carried load is minimal.

Such devices, which are generally installed in public places, are subject to strict operating rules and must therefore be very robust.

From this perspective, the aforementioned patent recommends the use, as means of rolling, of balls or rollers in substantially semi-spherical or semi-cylindrical recesses.

The invention, that falls within this context, is intended to provide a conveyor of simple structure, of robust construction, and moreover capable of offering, on the rolling surface, a better rolling surface than the device of the prior art.

To accomplish this, the device according to the invention, moreover in compliance with the definition by extension which the above preamble gives, is essentially characterised in that it comprises a plurality of side walls each of which is integral to the chassis and extends on a plane perpendicular to the transversal direction as far as an upper edge set back from the rolling surface, and a plurality of axes each of which extends parallelly to the transversal direction and crosses at least two adjacent side walls, and in that the means of rolling comprise a plurality of rollers laid out in a plurality of successive rows, adjacent one to another along the longitudinal direction, each roller being rotationally assembled on one of said axes.

Preferably, each row of rollers comprises one or several rollers stacked in a coaxial manner in the transversal direction.

Each roller can be rotationally assembled on its axis using a ball, roller or oil-ring lubricated bearing.

In the conveyor according to the invention, at least some of the rollers can have a different external diameter.

According to its preferred embodiment, the conveyor comprises a plurality of support bases aligned in the transversal direction, each support base being made integral to the chassis and bearing at least two mutually parallel side walls.

The support bases are advantageously butt-joint aligned in a transversal direction, and create a single row in the longitudinal direction.

Each support base has for example, downstream from the side walls in the longitudinal direction, a latch rod of substantially triangular section whose upper face drops below the rolling surface and moves further and further from the side walls.

Each latch rod can have a lower face and a downstream edge in the shape of a comb and imbricated into the second drive system.

The assembly and maintenance of the conveyor according to the invention can be optimised by fitting each support base to the chassis in a detachable manner, the latter bearing two ends with respective means of assembly onto a fixed infrastructure.

Other characteristics and advantages of the invention will emerge from the below description, given by means of example and non restrictive, with reference to the annexed diagrams, among which:

Figure 1:
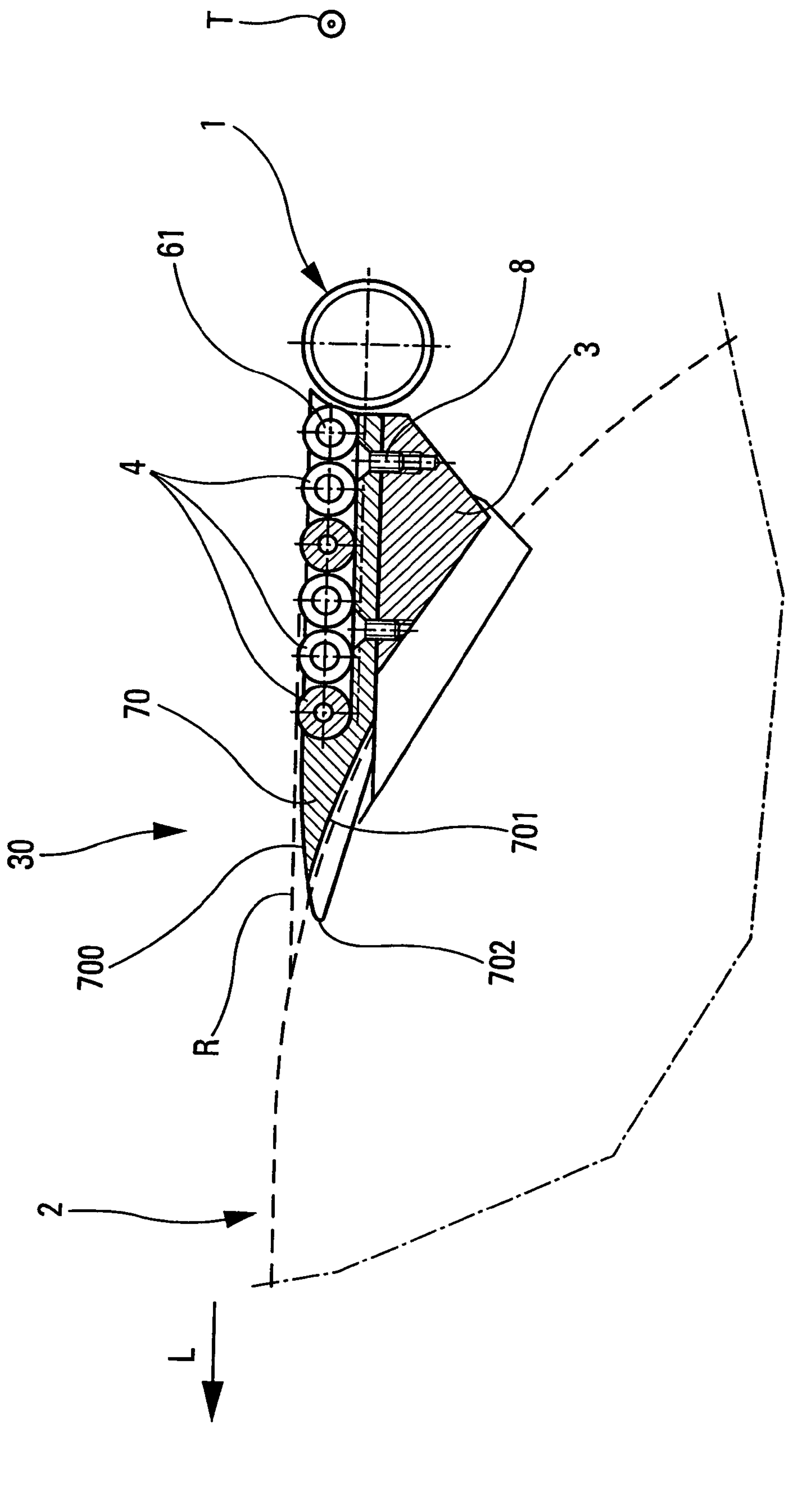
FIG. 1 is a cross section of the conveyor according the invention and of the two drive systems which it connects, the unit being viewed in a sectional plane perpendicular to the transversal direction.

As previously stated, the invention relates to a conveyor intended to integrate into a conveying system, such as a pedestrian conveyor, notably allowing pedestrians to be moved via a translation in a longitudinal direction L.

Such a system typically comprises a first active drive system 1, for example a motorised conveyor, a second active drive system 2, for example an endless belt put into motion by another motorised roller, the conveyor according to the invention being passive, that meaning not itself motorised, and placed between the two active drive systems 1 and 2 in the longitudinal direction.

The conveyor, the object of this invention, knowingly comprises a chassis 3 and means of rolling 4.

The chassis 3 extends in a transversal direction T, perpendicular to the longitudinal direction L.

At each of its ends, this chassis 3 is equipped with means of assembly 30 allowing it to be fitted to a fixed infrastructure (not shown).

The means of rolling 4 are at least indirectly supported by the chassis 3 and define a rolling surface R.

As is shown more accurately in FIG. 1, the rolling surface R connects the two drive systems 1 and 2, and is substantially coplanar with the upper transportation surfaces respectively defined by the drive systems 1 and 2.

Instead of being comprised of balls or rollers in the respective channels as in the known device, the means of rolling 4 of the conveyor according to the invention are comprised of rollers rotationally assembled on the axes.

To achieve this, this device first and foremost comprises a plurality of side walls, such as 51 to 54, each of which is integral to the chassis 3 and extends in a plane perpendicularly to the transversal direction T.

Each side wall terminates with an upper edge, such as 510 to 540, which is set back compared to the rolling surface R, that being below this surface when the conveyor is horizontal.

This device furthermore comprises a plurality of axes, such as 61 to 66, each of which extends parallelly to the transversal direction T and crosses at least two adjacent side walls, such as 51 and 52.

Finally, each roller 4 is rotationally assembled on one of the axes 61 to 66, the rollers 4 being collectively laid out to create a set of several successive rows, numbered 41 to 46 and mutually adjacent to the longitudinal direction L.

Figure 2:
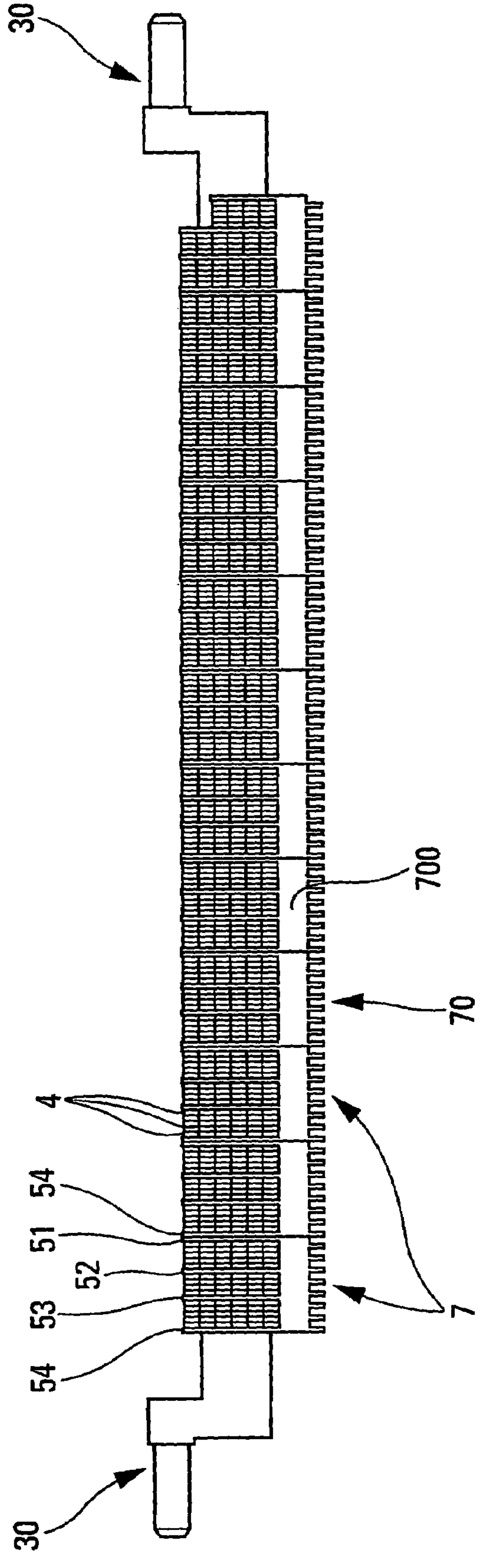
FIG. 2 is a top view of the conveyor according to the invention.
Figure 3:
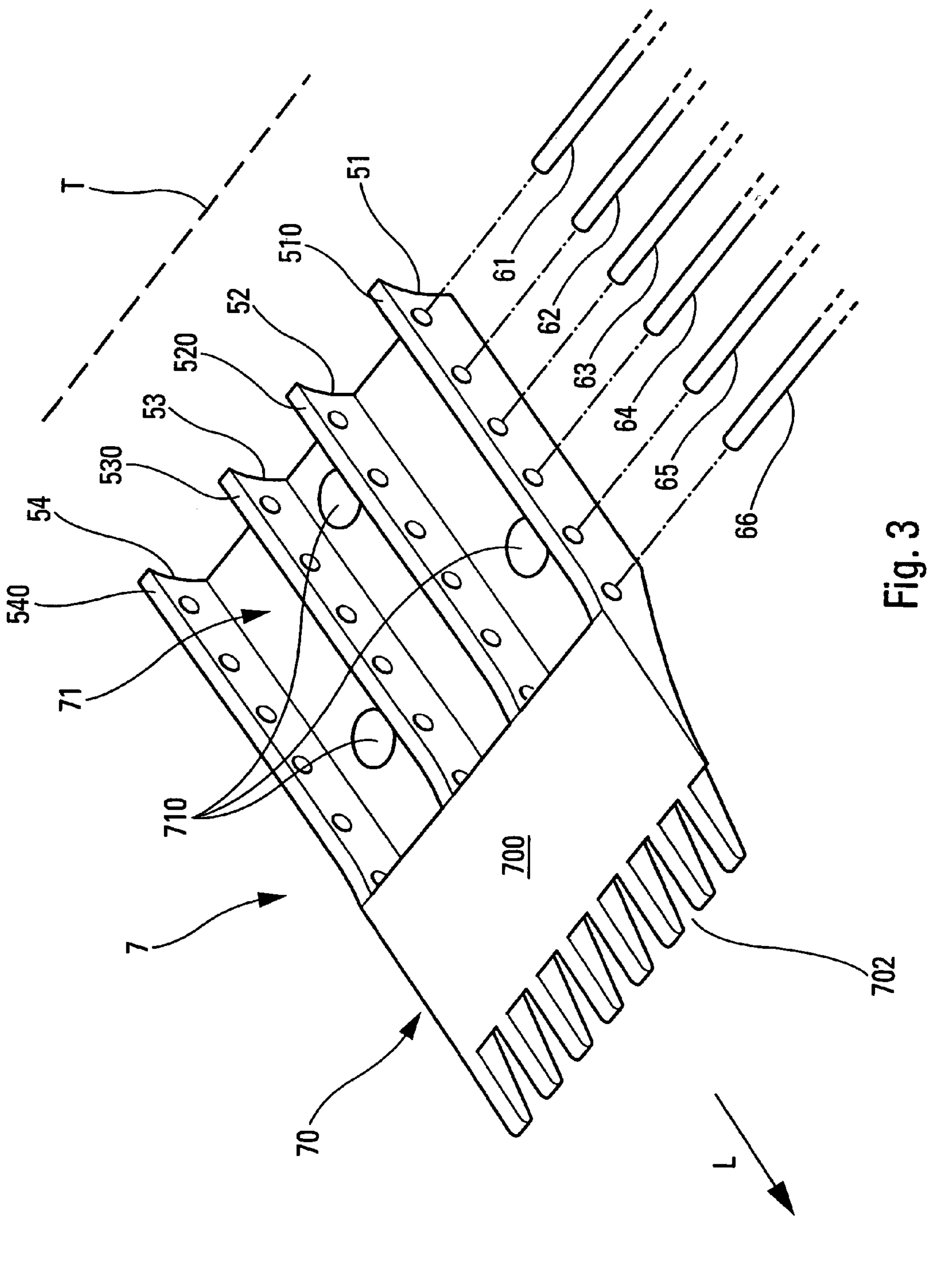
FIG. 3 is a perspective view of a support base used in the conveyor according to the invention, and being viewed before the fitting of the axes and rollers which it supports.
Figure 4:
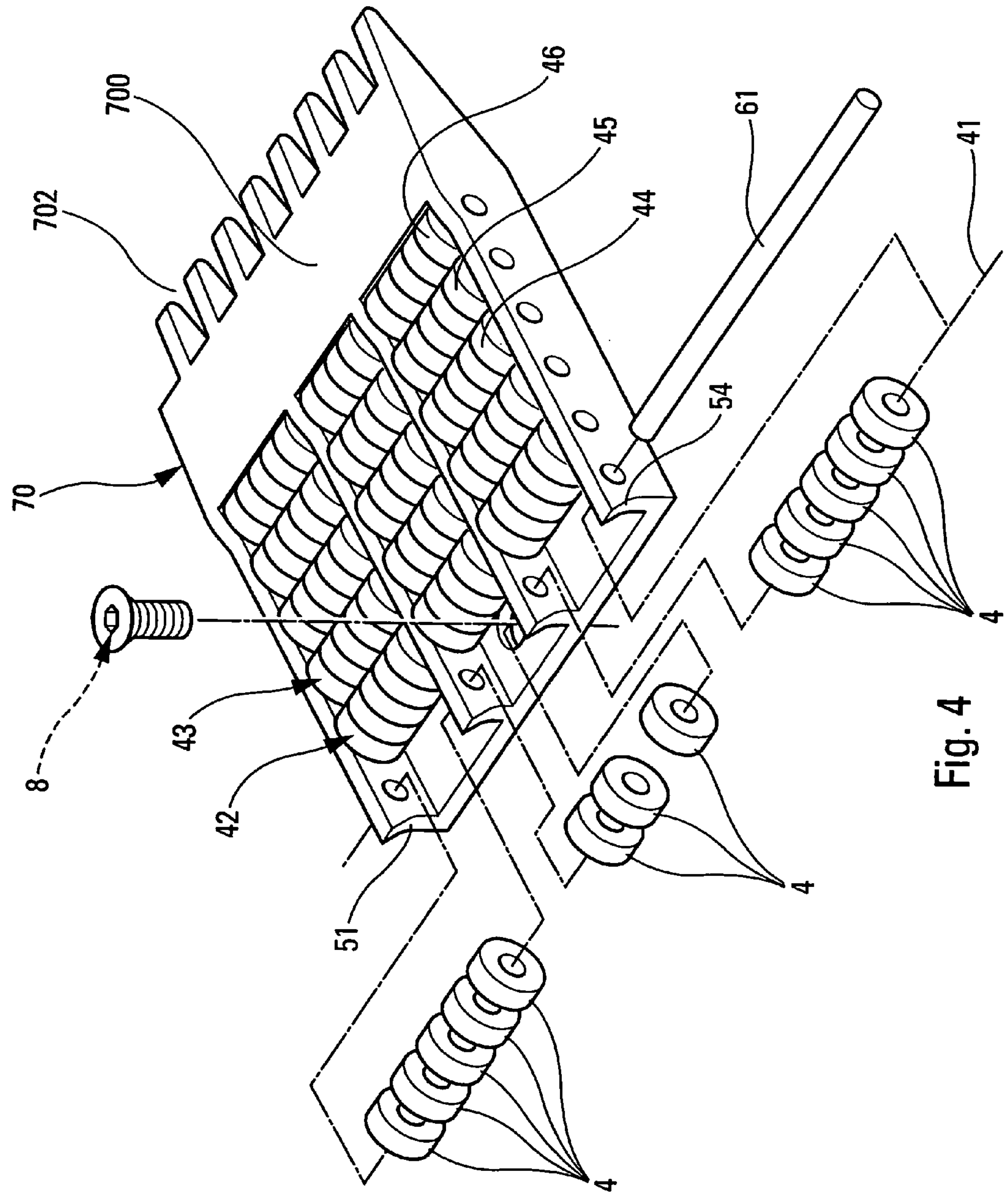
FIG. 4 is an enlarged perspective view of such a support base, shown with the axes and rollers it houses.

As is best seen in FIGS. 1 to 3, the side walls are advantageously held by the support bases 7 each of which is fixed to the chassis 3 in a detachable manner, for example through the use of screws such as 8 inserted into orifices 710 made in a back wall 71 of this support 7.

The support bases 7 are fixed to the chassis 3 so as to be butt-joint aligned in the transversal direction T, and so as to create a single row in the longitudinal direction L.

Each support base can comprise more than two side walls, and for example four side walls 51 to 54 as illustrated in the figures.

Furthermore, the rollers can be bigger or smaller in size in the transversal direction T.

Nevertheless, it is advantageous that each of the rows of rollers, such as 41 to 46, comprises several rollers 4 stacked in a coaxial manner in the transversal direction T, even on the same support base 7.

At least some of the rollers 4 can have a different external diameter, and each roller can be rotationally assembled on its axis, such as 61 to 65, using a ball, roller or oil-ring lubricated bearing.

Each support base 7 advantageously has a latch rod 70 of substantially triangular section placed downstream, in the longitudinal direction L, in relation to the back wall 71 of this support and to the side walls 51 to 54 which extend from it.

As FIG. 1 notably shows, the latch rod 70 can be shaped so that its upper face 700 drops below the rolling surface R and moves further and further from the side walls 51 to 54, this layout promoting the transferring of the load transported towards the second drive system 2.

Furthermore, the lower surface 701 and the downstream edge 702 of the latch rod 70 of each support 7 are advantageously comb shaped so that they can be imbricated into the second drive system 2, for which purpose they adopt a complimentary shape.

What is claimed is:

1. A passive conveyor positioned in the longitudinal direction (L) between two active drive systems (1 and 2) of a pedestrian conveyor comprising a chassis (3) extending in a transversal direction (T) perpendicular to the longitudinal direction (L), as well as means of rolling (4), supported by the chassis (3) and defining a rolling surface (R) connecting the two drive systems (1 and 2), characterized in that it comprises a plurality of side walls (51 to 54) each of which is abutting to the chassis (3) and extends in a plane perpendicular to the transversal direction (T) along an upper edge (510 to 540) set back from the rolling surface (R), and a plurality of axes (61 to 66) each of which extends parallelly to the transversal direction (T) and crosses at least two adjacent side walls (51 and 52), in that the means of rolling (4) comprise a plurality of rollers (4) laid out in a plurality of successive rows (41 to 46), adjacent to one another along the longitudinal direction (L), each roller being rotationally assembled to one of said axes (61 to 66) and in that this conveyor comprises a plurality of support bases (7) aligned in the transversal direction (T), each support base (7) being made integral to the chassis (3) and bearing at least two mutually parallel side walls (51 and 54).

2. The passive conveyor as set forth in claim 1, characterized in that each row of rollers (41 to 46) comprises one or several rollers (4) stacked in a coaxial manner in the transversal direction (T).

3. The passive conveyor as set forth in claim 1, characterized in that each roller (4) is rotationally assembled on its axis (61 to 66) using a ball, roller or oil-ring lubricated bearing.

4. The passive conveyor as set forth in claim 1, characterized in chat at least some of the rollers (4) have a different external diameter.

5. The passive conveyor as set forth in claim 1, characterized in that the support bases (7) are butt-joint aligned in a transversal direction (T) and create a single row in the longitudinal direction (L).

6. The passive conveyor as set forth in claim 1, characterized in that each support base (7) has, downstream from the side walls (51 to 54) in the longitudinal direction (L), a latch rod (70) of substantially triangular section whose upper face (700) drops below the rolling surface (R) and moves further and further from the side walls (51 to 54).

7. The passive conveyor as set forth in claim 6, characterized in that each latch rod (70) has a lower face (701) and a downstream edge (702) in the shape of a comb and is imbricated into the second drive system (2).

8. The passive conveyor as set forth in claim 1, characterized in that each support base (7) is fitted to the chassis (3) in a detachable manner.

9. The passive conveyor as set forth in claim 1, characterized in that the chassis (3) has two ends with respective means of assembly (30).

* * * * *